March 28, 1950  C. M. MACON  2,502,265
COMBINATION SERVING CART AND DISHWASHER
Filed Aug. 11, 1944  3 Sheets-Sheet 1
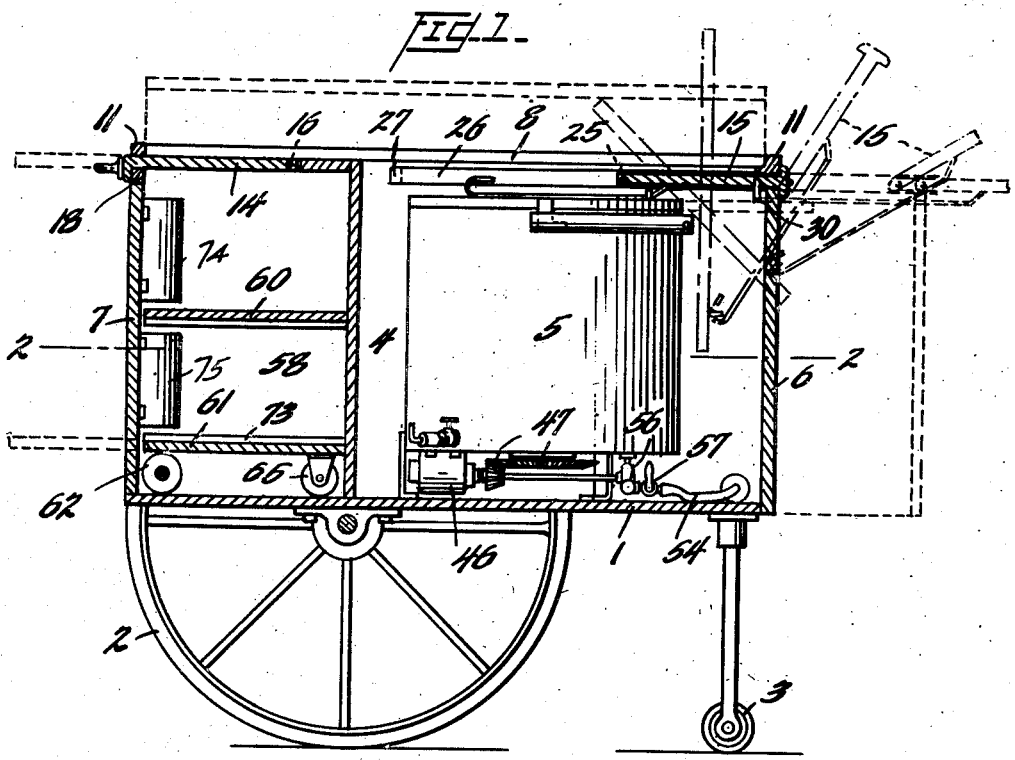
Inventor
Cyrene M. Macon March 28, 1950 C. M. MACON 2,502,265
COMBINATION SERVING CART AND DISHWASHER
Filed Aug. 11, 1944 3 Sheets-Sheet 2
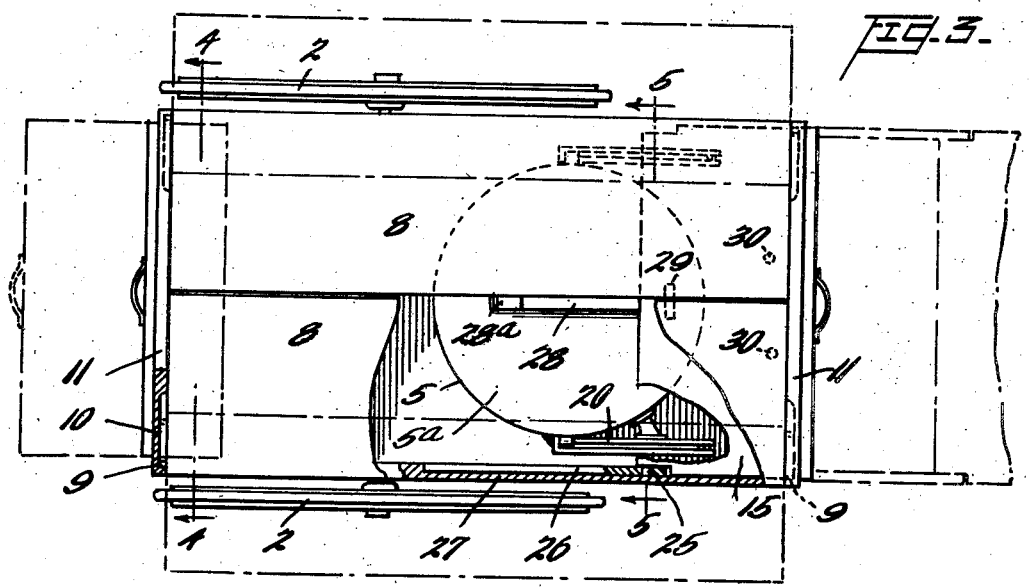
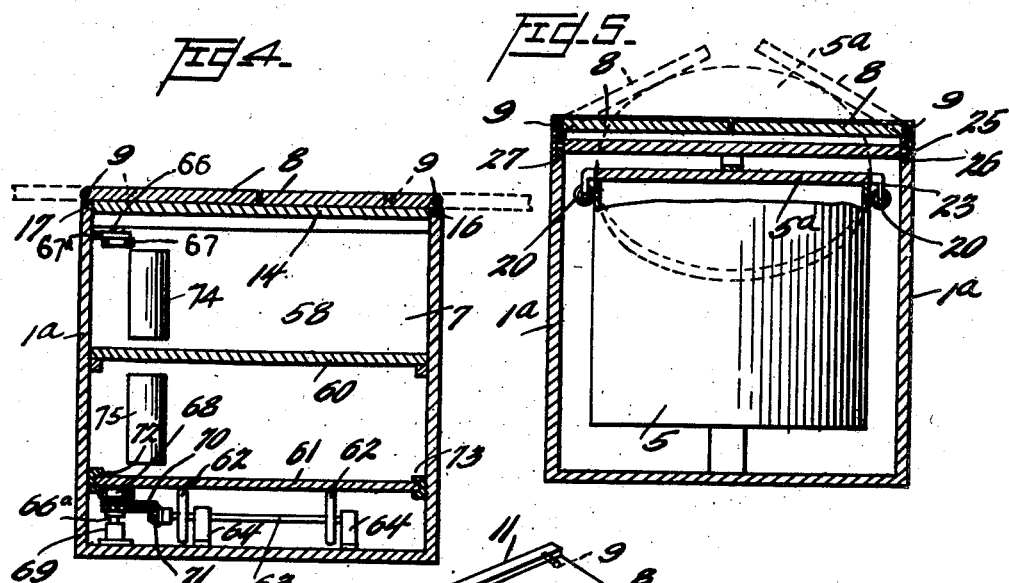
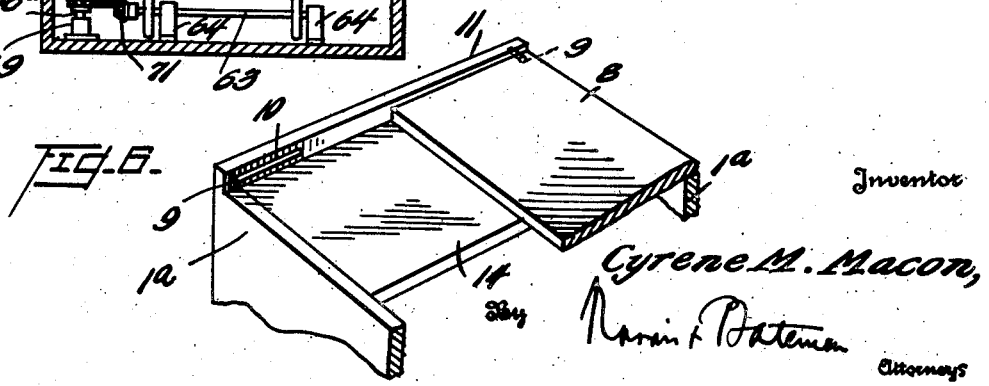
Inventor
Cyrene M. Macon,
By
Attorneys

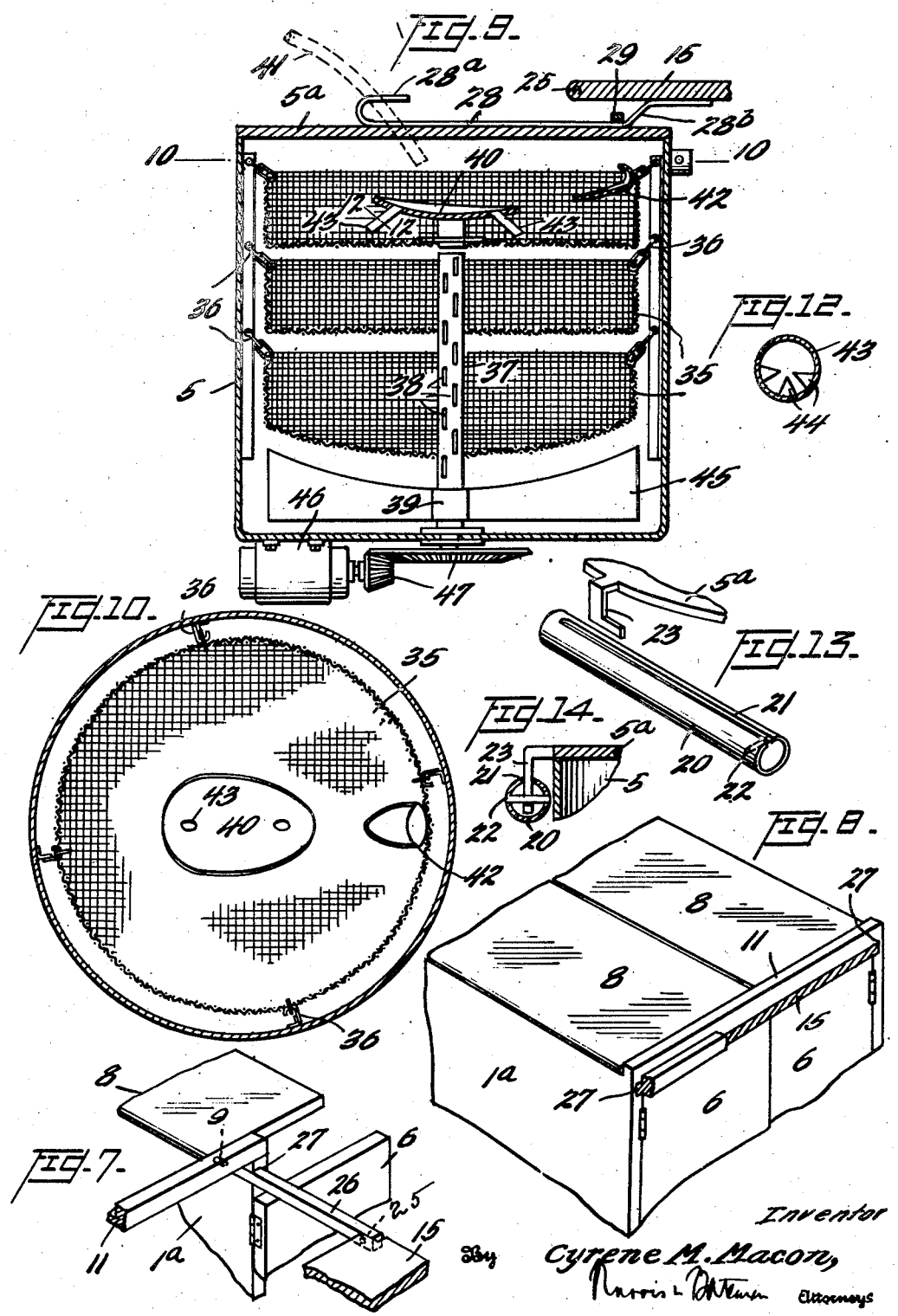

Patented Mar. 28, 1950

2,502,265

UNITED STATES PATENT OFFICE 2,502,265

COMBINATION SERVING CART AND DISHWASHER

Cyrene M. Macon, Dallas, Tex.

Application August 11, 1944, Serial No. 549,049

8 Claims. (Cl. 134—115)

The present invention relates to a combined serving cart and dish washer, and the primary object of the invention is to provide a combination cart which is portable so that it may be moved to any desired place for use as a serving or dining table, and which is equipped with a dish washer which is normally concealed within the cart but may be readily brought into use.

A more particular object is to provide a serving cart which is provided with leaves which normally close the top of the cart and may serve as a dining table top or to receive a serving tray, the interior of the cart containing a dish washer, the leaves being movable into positions to render the dish washer accessible for use, and adjustable into positions to provide extensions of the table top.

Another object is to provide a combined serving cart and dish washer wherein the dish washer is normally closed by a lid, and means is provided for removing the lid from the washer to uncover it for use, the washer lid being tiltable into engagement with hinged lids on the cart, thereby lifting them into partially opened condition and thus facilitating complete opening thereof to uncover the washer for use.

To these and other ends, the invention consists in certain improvements and combinations and arrangements of parts, all as will be hereinafter described, the features of novelty being pointed out more particularly in the claims at the end of this specification.

In the accompanying drawings:

Fig. 1 is a vertical section of a combination serving cart and washing machine embodying the present invention.

Fig. 2 is a horizontal section taken on the line 2—2 in Fig. 1.

Fig. 3 is a top plan, partly broken away, showing the leaves closed by full lines, and in extended positions by the dotted lines.

Fig. 4 is a vertical section taken on the line 4—4 in Fig. 3.

Fig. 5 is a vertical section taken on the line 5—5 in Fig. 3.

Fig. 6 is a perspective view of one end of the cart, showing the grooves for pivoting and slidably guiding the side leaves.

Fig. 7 is a detail perspective view showing one side leaf and one end leaf extended, and the adjacent door in open position.

Fig. 8 is a perspective view showing the leaves and doors closed.

Fig. 9 is a vertical section taken centrally through the dish washer.

Fig. 10 is a horizontal section taken on the line 10—10 in Fig. 9.

Fig. 11 is an elevation of the lower portion of the dish washer with parts broken away to show interior elements thereof.

Fig. 12 is a detail section taken on the line 12—12 in Fig. 9.

Fig. 13 is a collective view in perspective, showing the slidable and pivotal connection between the dish washer and its lid.

Fig. 14 is a detail section through the assembled parts shown in Fig. 13.

Similar parts are designated by the same reference characters in the several views.

The combination serving cart and dish washer shown in the present instance comprises a body 1 which is preferably of a generally rectangular form and may be constructed advantageously of wood, although other materials may be used, the cart being supported by a pair of wheels 2 and a pair of castors 3 so that it may be easily moved to any desired place in a house or apartment. The body provides a main compartment 4 toward one end in which the dish washer 5 is enclosed, and a compartment toward the other end adapted to contain shelves and a drawer. A pair of hinged doors 6 affords access to an end of the compartment 4 and to the dish washer therein, and a hinged door 7 affords access to the other compartment.

The top of the body is provided with a pair of side leaves 8 which, when closed, cover the compartment 4 containing the dish washer, and provide a flat top which may be used as a serving or dining table or to receive a serving tray. These leaves are mounted pivotally to swing upwardly and outwardly, thereby uncovering the dish washer when the same is to be used, and these leaves are slidable inwardly, after they have been opened, to provide extensions along the sides on which dishes may be placed before and after washing. Accordingly, each leaf 8 is of a width equal to one-half the width of the body, and they are provided adjacent to their outer edges with pins 9 which project beyond the ends of the respective leaves and are adapted to pivot and also slide in grooves 10 formed in the inner sides of a pair of rails 11 which extend across and are secured to the top of the body adjacent to its ends. This arrangement enables the leaves 8 to be first swung upwardly, outwardly and then downwardly about the pins 9 as centers until the leaves extend outwardly horizontally from the sides, and then slid inwardly to bring the pins 9 to the inner ends of the grooves 10, the leaves resting on the upper edges of the sides 1ᵃ of the body and being thereby supported in laterally extended positions, as indicated by the dotted lines in Figs. 3 and 4. While the side leaves are in such laterally extended positions, an opening is provided between their inner edges which is of ample size to afford access to the top of the dish washer.

A pair of end leaves 14 and 15 are also mounted slidably in the ends of the body in a plane immediately below the side leaves, which may serve as end extensions of the top when used as a table. The end leaf 14 is guided by pins 16 which project from its ends adjacent to its inner edge are adapted to travel in grooves 17 extending longitudinally of the body side members adjacent to their upper edges, this leaf sliding over and being supported by a rail 18 which extends across the body beneath it.

The other end leaf 15 is provided with means for removing a lid or cover 5ᵃ from the top of the dish washer and replacing it thereon, and also for lifting or partially opening the side leaves 8 to facilitate complete opening thereof when the dish washer is to be used. For these purposes, the leaf 15 is slidable into an extended position and is also tiltable. As shown in the present instance, the receptacle 5 of the dish washer is provided with a pair of rails 20 which are rigidly secured to its opposite sides adjacent to its top and extend in parallelism toward the opening in the body which is normally closed by the doors 6. These rails are preferably each composed of a tube having a slot 21 extending along its upper side, a pin 22 extending across the tube at the end thereof remote from the receptacle, and the lid 5ᵃ is provided at its diametrically opposite sides with hooks 23 which extend downwardly through the slots 21 and into the respective tubes to travel axially thereof until arrested by the pins 22, these pins being so located that, when they are engaged by the hooks on the lid, the latter will have passed off the top of the receptacle of the washer, and will be in a position to tilt about the pins 22 as a center while the hooks engaging the pins pivotally suspend the lid. Since the side leaves 8 are immediately above the lid, these leaves will be swung upwardly about their pins 9 as centers by the trailing edge of the lid 5ᵃ as it tilts from a horizontal position above the washer into a position at a side thereof, as indicated by the dotted lines in Figs. 1 and 5. The end leaf 15 which is operable to withdraw the lid from the washer and tilt it as described, is provided in the present instance with pins 25 which project from its ends adjacent to its inner edge and are engaged rotatably in rails 26 which are slidable in grooves 27 in the sides 1ᵃ of the body adjacent to their upper edges, and the ends of this leaf are slidable in the grooves 27, whereby this leaf is slidable longitudinally of the cart body and is also tiltable about the pins 25 as an axis after it has been withdrawn from the grooves 27. The leaf 15 carries a hook 28 which is secured to its under side and has a slidable connection with the lid 5ᵃ by means of a loop 29 which is fixed to the upper side of the lid, and through which the hook is slidable. The slidable end leaf 15 also carries a pair of downwardly extending projections 30 which are in line with the respective doors 6, and engage these doors and open them when this leaf is extended. In operating the arrangement just described to remove the lid of the dish washer, the end leaf 15 is pulled out of the grooves 27, the hook 28 sliding in the loop 29 on the lid until the bent end 28a on the hook reaches the loop 29 whereupon continued extension of the leaf will draw the lid horizontally from the top of the washer, as indicated by the horizontal dotted lines in Fig. 1, the projections 30 on the under side of the leaf 15 having previously engaged the end doors 6 and swung them into open position. The opening in the end of the compartment 4 provides sufficient space in which the lid may tilt into a position at the side of the washer, and such tilting of the lid is effected by tilting the end leaf 15 upwardly about its pivot pins 25. If it is desired to bring the lid into a vertical position besides the washer, the leaf 15 may be pushed inwardly as it is tilted, as indicated by the dotted lines in Fig. 1, the lid tilting about the pins 22 as a center; or if desired, the lid may be detached from the washer by lifting its hooks 23 from the pins 22 and the leaf 15 may be detached from the lid by disengaging its hook 28 from the loop 29, it being then possible to place the lid and end leaf in upright position in the end of the compartment and against the washer. After the dish washing operation has been completed, the lid and end leaf are returned to their normal positions by reverse operations; if the hook 28 on the end leaf 15 remains attached to the lid, this leaf is tilted downwardly to rock the lid 5ᵃ back to its horizontal position about the pins 22 as a center, and the leaf is inserted in the grooves 27 and pushed inwardly, the hook 28 sliding in the loop 29 until a shoulder 28ᵇ on the hook abuts against the loop 29 whereupon continued inward movement of the leaf will carry the lid with it into closed position on the top of the washer. If it is desired to use the leaf 15 as a table top extension at that end thereof, this leaf may be withdrawn only partially, leaving a part of this leaf in the grooves 27 whereby it will be supported in its extended horizontal position.

While the side leaves 8 are opened and supported horizontally in their laterally extended positions, as indicated by the dotted lines in Fig. 3, they may be used to support dishes before or after washing, or during the washing operation. Also, when a tray is placed on the top of the cart after the side leaves have been opened and placed in their extended positions as just described, they may be used as table extensions beyond the side edges of the tray for the support of dishes, and the end leaves may be drawn out and similarly used as table extensions beyond the ends of the tray.

After the dish washing operation has been completed, the side leaves 8 are pulled out horizontally to bring their pivot pins 9 to the outer ends of the grooves 10, and then swung upwardly, inwardly and downwardly about these pins as pivots, thus bringing these leaves into closed positions, as shown by the full lines in Fig. 3, the end leaves 14 and 15 are pushed inwardly, and the doors 6 closed.

The dish washer is preferably of the same general construction as that shown in my prior Patent No. 1.631.045 granted May 31, 1927, with certain improvements. As shown, it comprises a suitable number of trays 35 composed of woven wire or other foraminous material and provided at their peripheries with hooks 36 for removably suspending them in the cylindrical receptacle 5 in superposed relation, these trays being adapted to receive the dishes to be washed and to support them to receive washing solution circulated in the receptacle, the trays containing the dishes being removed from the receptacle when the washing operation is completed. A vertical water circulation pipe 37, having orifices 38 spaced around its circumference, is mounted concentrically within the receptacle, it being supported at its lower end in a bearing sleeve 39 rotatable in the bottom of the receptacle and having a watertight fit therein. This pipe extends upwardly through the centers of the trays to the bottom of the top tray and is closed at its upper end. A bowl 40 is mounted in the top tray, this bowl being adapted to receive soap powder or other suitable washing material, and water to mix therewith for charging the washer with washing solution, and it serves to distribute the resulting washing solution to the dishes in the trays. For these purposes, this tray is concave or spoon-like in form, and is adapted to receive a stream of water, as from a hose 41 as indicated in dotted lines in Fig. 9. The bowl 40 is also preferably of elongated or approximately of oval form, and a cup 42 is preferably mounted on the top tray immediately beyond one end of the bowl whereby water flowing into the bowl at one end will be thrown against the cup and splashed thereby back onto the dishes. A pair of troughs 43 are inclined downwardly and outwardly from the bottom of the bowl for distributing the washing solution from the bowl onto the dishes contained in the trays below, the outlet ends of these troughs being preferably provided with inturned tongues 44 (Fig. 12) for scattering or spreading the washing solution from these troughs among the dishes in the trays.

Water circulating means is provided in the lower portion of the receptacle, such means comprising preferably a set of blades 45 which extend radially from the sleeve bearing 39 at a level immediately above the bottom of the receptacle. The blades are rotated at a suitable speed during the dish washing operation by an electric motor 46 which may be bolted or otherwise secured to the under side of the receptacle and connected to the bearing 39 by bevel or other suitable gearing 47. The blades, during their rotation, force the washing solution outwardly and upwardly in the cylindrical receptacle, the solution returning to the inner ends of the blades through the central pipe 37 and the central portion of the receptacle, thus maintaining a circulation of the washing solution among the dishes during the washing operation.

A pot washer is also provided which is preferably connected to the receptacle 5 to receive washing solution therefrom, and is rendered accessible by opening of the doors 6. As shown, the pot washer comprises a hollow head 50 having prongs 51 adapted to receive a dish cloth or similar pot washing body 52 which is clamped by the prongs by a slidable locking ring 53. The head 50 is connected to the receptacle 5 to receive washing solution therefrom by a flexible hose 54, a rubber or other compressible bulb 55 being interposed between the hose and head which may be squeezed to momentarily increase the pressure of the solution flowing to the head. The washing solution may be delivered from the receptacle 5 at the desired pressure by a pump 56 which may be driven from the motor 46 and has its inlet in communication with the bottom of the receptacle. A valve 57, which is accessible while the doors 6 are open, may be employed to control the flow of the washing solution to the pot washer, and this valve and the pump may be employed for draining the washing solution or rinsing water from the dish washer when the washing operation has been completed, the hose discharging into a sink or other means of disposal.

The space within the end of the body of the cart opposite to that occupied by the dish washer may be utilized for various purposes, it being shown provided in the present instance with shelves 60 which are preferably removable and may contain, for example, dishes, and when removed, will provide a space for other articles, such as bottles containing drinks and the like. The bottom of the space 58 is provided with a drawer 61 adapted to contain, for example, table linen, and which is extensible to bring the linen or the like thereon within easy reach. As shown, the forward portion of the drawer rests on a pair of rollers 62 fixed on a shaft 63 journaled in bearings 64 mounted on the bottom of the compartment 58, and the rear portion of the drawer carries a roller 65 adapted to ride on the bottom of the compartment.

Extension and retraction of the drawer are preferably effected automatically by the opening and closing of the door 7 which provides access to the compartment 58, the door being hinged for this purpose on vertical shafts 66 and 66a which are fixed in brackets 67 and 68 fastened to the door to rotate therewith as it is opened and closed, these shafts being mounted to rotate in bearings 67a and 69 supported on the body of the cart. The shaft 66a has a gear segment 70 fixed thereto and meshing with a pinion 71 fixed to the roller shaft 63. The drawer may be guided in its movements by suitable guide rails 72 and 73 which prevent tipping of the drawer when extended. When the door 7 is swung open, the gears 70 and 71 operated by the shaft 66a fixed to the door, rotate the rollers 62 in a direction to advance or extend the drawer from the compartment 58, and when the door is closed, the drawer is returned to its normal position within said compartment. Receptacles 74 and 75 for table silverware are preferably secured to the inner side of the door 7 adjacent to its pivot shafts, these receptacles being concealed when the door is closed, but being brought into position for convenient reach when the door is opened.

The present invention provides a combination tea cart and dish washer which can be manufactured inexpensively and will relieve housekeepers of much of the drudgery of serving meals and washing dishes. The portability of the cart enables it to be placed readily in any desired part of a house or apartment, and although it is normally no larger than a conventional tea cart, the extension leaves enable it to be enlarged to a size comparable with that of a dining table. The cart is especially adapted to be used with a serving tray which may be placed on top of the cart, and while the side and end leaves are in their inner positions, the cart is adapted to the serving of meals in different rooms, or when used as a table, the side and end leaves may be extended to provide leaves around the tray to serve as table surfaces. When the cart is to be employed for washing dishes, the dish washer may be readily exposed and operated, for which purpose the cart may be moved to the kitchen where the necessary water supply and drain are available.

I claim:

1. A portable serving cart comprising a body open at the top and having laterally extending grooves at the outer portions only of opposite top edges thereof, and a pair of leaves having pins projecting from their ends into the grooves for rotation and sliding movement therein, the leaves normally closing the top of the body, and adapted to swing upwardly and outwardly about said pins to provide lateral extensions on the body, the leaves being slidable inwardly into partially extended position and thereby bring said pins into positions at the inner ends of said grooves to thereby support the leaves in partially extended position at the respective sides of the body.

2. A portable serving cart comprising a body open at the top and having laterally extending grooves at the outer portions only of opposite edges thereof immediately above the level of adjacent top edges of the body, a pair of leaves having pins projecting from their ends into the grooves for rotation and sliding movement therein, the leaves normally closing the top of the body, and adapted to swing upwardly and outwardly about said pins to provide lateral extensions on the body, the leaves being slidable inwardly into partially extended position to bring said pins into supporting positions at the inner ends of said grooves while the partially extended leaves rest on said adjacent top edges of the body, and leaves slidably mounted in the ends of the body immediately below the first-mentioned leaves to provide end extensions on the body.

3. A combination serving cart and dish washer comprising a body, a dish washer therein including a receptacle open at the top to receive dishes and having a lid slidably and tiltably mounted thereon, a leaf slidably mounted in the body for withdrawal therefrom, means operative by said leaf when withdrawn for sliding and tilting the lid on the washer, and a pair of leaves pivotally mounted on the body and normally closing the top of the body, said pair of leaves being located immediately above the lid for opening thereby when tilted by the first-mentioned leaf.

4. A combination serving cart and dish washer comprising a body, a dish washer therein including a receptacle open at the top to receive dishes and having guides at the top, and a lid having hooks slidable in said guides and tiltably connected thereto for removal of the lid from the washer, and a leaf slidably mounted in the body and having means for connecting it to the lid for sliding the latter from the top of the washer and then tilting it.

5. A combination serving cart and dish washer comprising a body, a dish washer therein including a receptacle open at the top to receive dishes and having guides at the top, and a lid having hooks slidable in said guides and tiltably connected thereto for removal of the lid from the washer, a leaf slidably mounted in the body and having means for connecting it to the lid for sliding the latter from the top of the washer and then tilting it, and a pair of leaves pivotally mounted on the body immediately above the lid of the washer and normally covering it, and movable toward open position to expose the washer when the lid thereof is tilted.

6. A portable serving cart comprising a body having an opening at the top, and a pair of complemental leaves having means at remote side edges of the leaves for pivotally and slidably connecting them respectively to opposite end edges of the opening in the top of the body for swinging movement of the leaves about said connecting means as pivots into positions to close said opening and for swinging movements outwardly about said connecting means and for inward movements edgewise in a common plane into positions to partially extend laterally from opposite sides of the body, said connecting means and opposite side edges of the opening in the body providing means for supporting the respective leaves in such partially extended positions.

7. A combination serving cart and dish washer comprising a body having an opening at the top, a dish washer mounted in the body and including a receptacle open at the top to receive dishes and having a lid for covering it, guides to which the lid is connected for sliding movement above said receptacle to uncover the same and for pivotal movement into a position at one side of the receptacle, a reciprocable and tiltable member in the body of the cart for withdrawal therefrom, an operative connection between said member and lid for sliding the latter to uncover said receptacle and for tilting the lid on the guides into said position at one side of the receptacle, and a pair of leaves on the top of the body of the cart movable into relatively separated relation to uncover the opening in the top of the body and expose said receptacle, and movable into substantially abutting relation to close said opening in the body and cover said receptacle.

8. A combination serving cart and dish washer comprising a body having an aperture at one end and doors normally closing said aperture, a dish washer contained in the body of the cart and including a receptacle open at the top to receive dishes and having a lid, means for guiding the lid to slide horizontally above the receptacle to cover and uncover the latter and to tilt into said aperture, a member slidably mounted in the body of the cart for withdrawal therefrom, means on said member engageable with the doors for opening them, and means connecting said member to the lid for sliding the lid horizontally to uncover said receptacle and for tilting the lid into the said aperture.

CYRENE M. MACON.

REFERENCES CITED

The following references are of record in the file of this patent:

UNITED STATES PATENTS

| Number | Name | Date |
|---|---|---|
| 319,967 | Fletcher | June 16, 1885 |
| 598,685 | Thorp | Feb. 8, 1898 |
| 614,722 | Isaacs | Nov. 22, 1898 |
| 1,051,311 | Clark | Jan. 21, 1913 |
| 1,131,137 | Hutchinson | Mar. 9, 1915 |
| 1,178,480 | Marx | Apr. 4, 1916 |
| 1,227,813 | Mahoney | May 29, 1917 |
| 1,349,634 | Stern | Aug. 17, 1920 |
| 1,390,224 | Wolcott | Sept. 6, 1921 |
| 1,508,495 | Bacharach | Sept. 16, 1924 |
| 1,631,045 | Macon | May 31, 1927 |
| 1,676,905 | King | July 10, 1928 |
| 1,696,683 | Kiefer | Dec. 25, 1928 |
| 1,742,393 | Hooper et al. | Jan. 7, 1930 |
| 1,908,657 | Birkenbile | May 9, 1933 |
| 1,956,048 | Sai | Apr. 24, 1934 |
| 1,990,300 | Miller | Feb. 5, 1935 |
| 2,062,704 | Forsyth | Dec. 1, 1936 |
| 2,102,449 | Zimmerman | Dec. 14, 1937 |
| 2,276,801 | Stoddard | Mar. 17, 1942 |
| 2,326,017 | Doughty | Aug. 3, 1943 |